United States Patent [19]

Myhre et al.

[11] Patent Number: 5,146,244
[45] Date of Patent: Sep. 8, 1992

[54] WINDOW PURGING SYSTEM FOR A COMBUSTION INSTRUMENT

[75] Inventors: Douglas C. Myhre, Eden Prairie; Richard J. O'Brien, Burnsville; David Y. H. Pui, Plymouth; Chuen-Jinn Tsai, St. Paul, all of Minn.

[73] Assignee: Rosemount Inc., Eden Prairie, Minn.

[21] Appl. No.: 468,650

[22] Filed: Jan. 23, 1990

[51] Int. Cl.$^5$ .............. G01J 5/02; G01J 5/08
[52] U.S. Cl. .................. 359/509; 374/125; 356/43
[58] Field of Search .............. 356/43; 374/125; 350/582, 584

[56] References Cited

U.S. PATENT DOCUMENTS

| | | | |
|---|---|---|---|
| 4,650,318 | 3/1987 | Pointer et al. | 374/125 |
| 4,657,385 | 4/1987 | Pointer | 356/43 |
| 4,738,528 | 4/1988 | Craft | 356/43 |
| 4,784,491 | 11/1988 | Penney et al. | 356/376 |
| 4,786,188 | 11/1988 | Myhre et al. | 374/125 |
| 4,836,689 | 6/1989 | O'Brien et al. | 374/125 |

FOREIGN PATENT DOCUMENTS 584195 12/1977 U.S.S.R. .

Primary Examiner—Ian J. Lobo
Attorney, Agent, or Firm—Kinney & Lange

[57] ABSTRACT

A purging air flow system that causes air to pass over a pyrometer lens or window to keep it clean and free from particulate contaminants has an annular, continuous slot for air inlet around the periphery of the lens to permit flow of air across the lens without any obstructions in the path of flow inwardly from the outer edge of the lens. An asymmetric flow pattern is established across the lens surface, either by having a differential size slot at different peripheral portions of the peripheral edge of the lens or window, or by providing a radial swirl about the axis of the window so that when the air goes through the slot, the tangential velocity creates a moving asymmetric flow pattern on the window surface.

15 Claims, 3 Drawing Sheets

WINDOW PURGING SYSTEM FOR A COMBUSTION INSTRUMENT

BACKGROUND OF THE INVENTION

The present invention relates to a system for purging contaminants from a lens of an instrument, such as a radiation pyrometer, which provides for a uniform and efficient cleaning of the lens across its entire light transmitting surface.

It is well known to use radiation pyrometers for detecting temperatures in gas turbines or in similar applications, where the radiation is sensed through a window or lens that is adjacent the turbines. Contaminants accumulating on the lens have been a problem, and while more efficient arrangements providing asymmetric flow for purging the lens have been arrived at, such as that shown in U.S. Pat. No. 4,836,689, it has been found that even with an asymmetric flow, where there are flow disrupting bars that define peripheral inlets, there is a tendency for formation of "bubbles" of low air flow on the lens adjacent and in the lee side of the bars where particles will tend to accumulate.

Eliminating the divider bars between provided air flow slots has been a problem because of internal construction limitation, and the bars have not been recognized as causing low flow areas which inhibit removal of particles. The present invention improves the performance of purging systems by eliminating obstructions around which air must flow in path to the lens, and providing asymmetric purge flow.

SUMMARY OF THE INVENTION

The present invention relates to a pyrometer that has a purging system in which air flow is directed inwardly from the peripheral edges of the window or lens which receives radiation for inhibiting particle deposition on the lens. The air flow passes through a continuous inlet slot around the lens periphery, without any flow reducing supports or bars defining ends of air inlet slot segments. The slot is a continuous, open slot extending 360° (400 grads) around the window or lens, and is arranged in a manner so that there are means for providing an asymmetric flow across the lens. A tube portion guides the flow across the lens and in a direction from the lens toward the radiation source. The tube is supported in an outer housing downstream from the lens, so that it is held in place at locations spaced from the lens to form the slot. The tube provides an outflow path of smaller cross sectional size than the lens.

The asymmetric flow pattern is obtained by making the slot wider (in axial direction) on one side of the lens, or by providing a swirling flow in an upstream passageway surrounding the lens prior to the time the air flow passes through the slot, so that the air that passes through the slot has a tangential velocity component that forms a moving asymmetric flow pattern on the lens or window surface.

These improvements eliminate any reduced inlet flow portions on the lens surface to insure adequate cleaning.

DETAILED DESCRIPTION OF THE PREFERRED EMBODIMENTS

Figure 1:
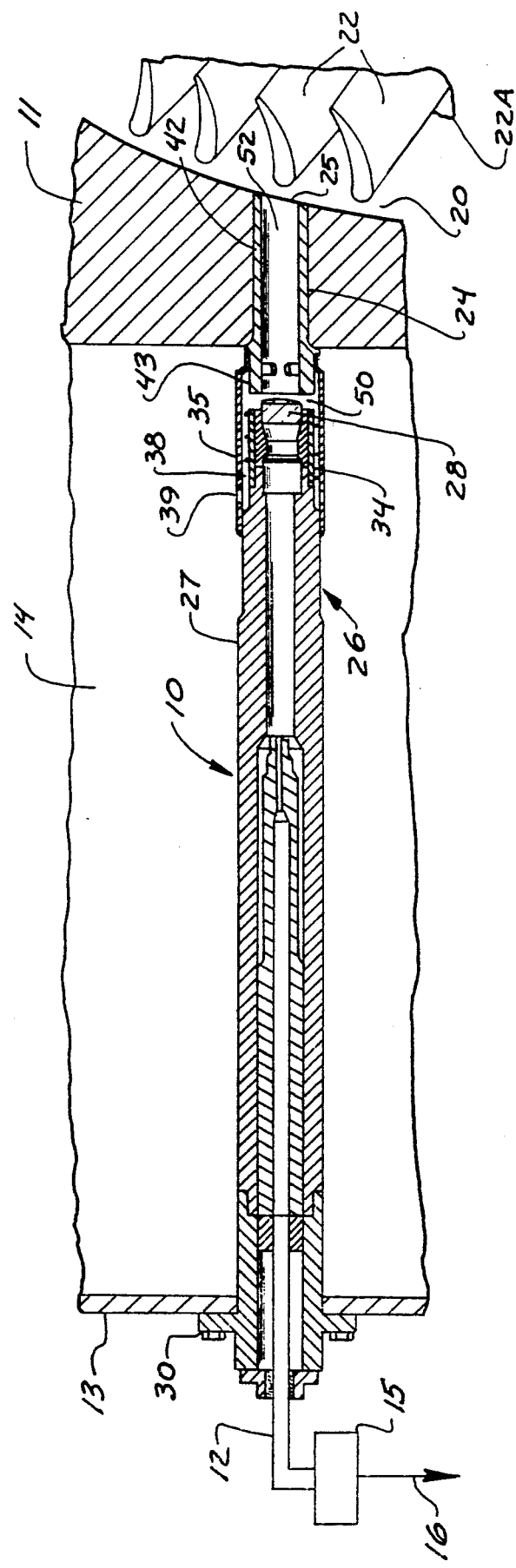
FIG. 1 is a fragmentary vertical sectional view through a portion of a typical turbine, and showing a sectional view of radiation pyrometer having a purge system made according to the present invention installed thereon.

A typical radiation pyrometer indicated generally at 10 is adapted to be mounted in a gas turbine, such as that used in a jet aircraft engine, which includes a turbine housing 11 and an outer shell or wall 13. The case 11 and wall 13 together define a compressor bypass passageway 14 that receives air under pressure from the inlet compressor, before combustion, and is filled, therefore, with relatively clean air that is above atmospheric pressure. It also is above the pressure that is in a section which is within the turbine chamber indicated at 20 on the interior of the housing or case 11. Turbine blades indicated at 22 are mounted on a suitable rotor 22A. The temperature of the turbine blades 22 is to be measured by the pyrometer 10 in order to insure that the designed operating temperatures are not exceeded, but yet permit the turbine to operate at or near its most efficient operating temperatures.

The case 11 has a port indicated at 25 opening to a passageway 24 which houses a sight tube assembly 26. The sight tube assembly will support a pyrometer barrel 27 in a suitable manner and at a suitable location, so that a pyrometer window, specifically, as shown, a lens 28, is positioned axially centered on the axis of the sight tube assembly 26 and in position to receive radiation from the turbine blades 22 through port 25.

The opposite end of the pyrometer 10 has a flange 30 that is mounted to wall 13 in a desired manner, and a suitable optical fiber cable 12 can be used for receiving the radiation from the turbine blades 22 which passes through the window or lens 28. The optical fiber cable is of conventional design and conveys radiation to a radiation sensing means 15 which senses the radiation conventionally, such as with a silicon photo diode and optical filters to produce an output along the line 16 indicating the temperature of the turbine blades.

Figure 2:
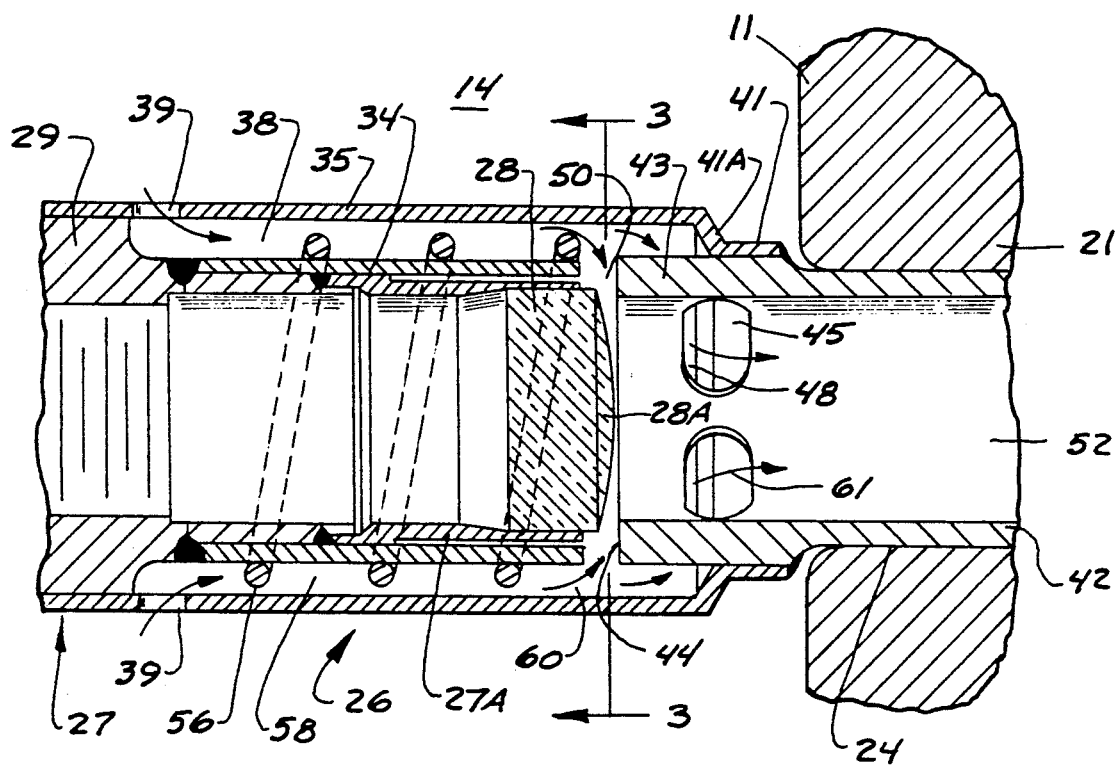
FIG. 2 is an enlarged sectional view of the lens portion of the radiation pyrometer shown in FIG. 1, and made according to the present invention.

The lens or window 28 is open to the combustion gas path 20, and there are undesired airborne particles formed in such combustion chamber. These particles will tend to deposit on the lens or window and degrade the performance of the pyrometer by attenuating radiation signals that are received, and thus make temperature indications less accurate. It has been known to provide passageways for flow of air over the window or lens 28, in order to purge particles from the lens. As shown in FIG. 2, the pyrometer barrel 27 is supported within an outer tubular sleeve end portion 35 of the sight tube 26, and is held therein in a sealing arrangement. The barrel 27 supports the lens 28 in an outer end portion of the barrel indicated at 27A, and there is a sleeve 34 that is mounted onto a reduced diameter portion 27A of the barrel 27. The sleeve 34 extends axially to surround the outer peripheral edge of the lens, but not protrude beyond the front surface 28A of the lens 28. The sleeve 34 is of smaller diameter than the internal diameter of outer tubular sleeve end portion 35 to form an annular passageway indicated at 38. Suitable openings 39 are provided in the sleeve portion 35 so that pressurized air from the chamber 14 will flow inwardly into annular passageway 38.

The tubular sleeve end portion 35 has a reduced size end neck 41 which fits around an outer end portion of a sight tube sleeve 42. Sight tube sleeve fits directly in passageway 24 of the case 11. Neck portion 41 is welded to the sight tube sleeve 42, to form part of the sight tube assembly 26. The sight tube sleeve 42 has an end portion 43 which extends into tubular end portion 35 in a direction away from the turbine. The end portion 43 of sight tube sleeve 42 has an inner end surface 44 that is spaced from and faces the outer surface 28A of the lens 28.

In addition, the end portion 43 of the sight tube sleeve 42 has a plurality of secondary flow apertures 45 defined therein which are positioned partially overlapped by the neck 41 and partially open to passageway 38. The tapered sleeve portion 41A which forms a transition from the neck 41 to the main part of tubular outer end portion 35 forms an orifice or opening 48 that can be controlled in size by positioning the neck 41 in a desired location along the end portion 43 of the sight tube sleeve 42 to provide an adequate size opening for secondary flow of the purging fluid that comes from the pressurized chamber 14 and passageway 38. The flow of purging fluid through apertures 45 carries particles entrained in the purging fluid downstream without having the particles pass over the lens surface 28A.

As can be seen in FIG. 2, there is a continuous annular gap forming a slot 50 between the lens 28 and the end surface 44 of the sight tube sleeve 42. The sight tube sleeve 42 has an interior passageway 52 that forms an outflow path for the major flow of purge air. The sight tube sleeve 42 is supported rigidly with respect to the pyrometer barrel 27 through the outer tubular portion 35, tapering portion 41A and neck 41. There is no need to have bridging web or both portions extending between the sleeve 34 and the sight tube sleeve 42. The annular slot 50 provides for unobstructed flow inwardly across the lens outer surface 28A. The end surface 44 is positioned so the spacing of surface 44 from the lens 28 is controlled to provide a directional path for air flow in generally radially inward direction from the edges of the lens and across the lens 28.

In order to provide an asymmetric flow, that is, a flow which does not form a stagnation area in the center of the lens, a helical surface shape such as helical spring 56 is provided around the outer surface of the sleeve 34, and is positioned in the passageway 38, which is for flow of purge air. A spiral or helical surface shape can be formed alternately by machining or deforming the surface, as well.

Figure 3:
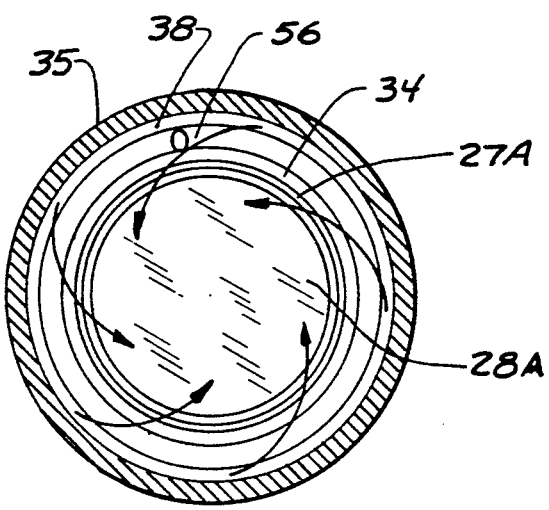
FIG. 3 is a sectional view taken as on line 3—3 in FIG. 2.

The outer diameter of the coils of helix 56 are spaced from the inner surface of the sleeve portion 35, so that the passageway 38 is only partially obstructed. A flow of air is possible around the outside of the helix in an axial direction. Also, there is a helical flow of air that is caused by the coils of the spring around the outer surface of the sleeve 34 in a helical passageway indicated at 58 between the adjacent coils of the spring. When air flows out through the slot 50, as indicated by arrows 60 in FIG. 2, it is also moving in a helical direction (see FIG. 3). The axial turning of a portion of the airflow as indicated by arrows 60 provides inertial separation of particles from the portion of the air which flows over the lens surface 28A. On the other hand, because of the tangential component of air movement (illustrated in FIG. 3), there is a shifting of the flow from time to time as the flow circulates causing any stagnation area on the lens to change in position across the lens itself. This will eliminate any dead spots or other low flow areas that cause accumulation of particles.

The primary flow through passageway 38 enters the slot 50 and then enters the passageway 52 and flows to the turbine chamber. A part of the flow called the secondary flow, exits through apertures 48 into the passageway 52 carrying inertially separated particles so they do not come in contact with lens surface 28.

The secondary flow is indicated by the arrows 61 in FIG. 2 and is less in volume than the primary flow, indicated by arrows 60 across the lens.

The unobstructed slot 50 provides a continuous curtain of air flowing over the periphery of the lens 28, and across the lens face to purge and remove particles.

Figure 4:
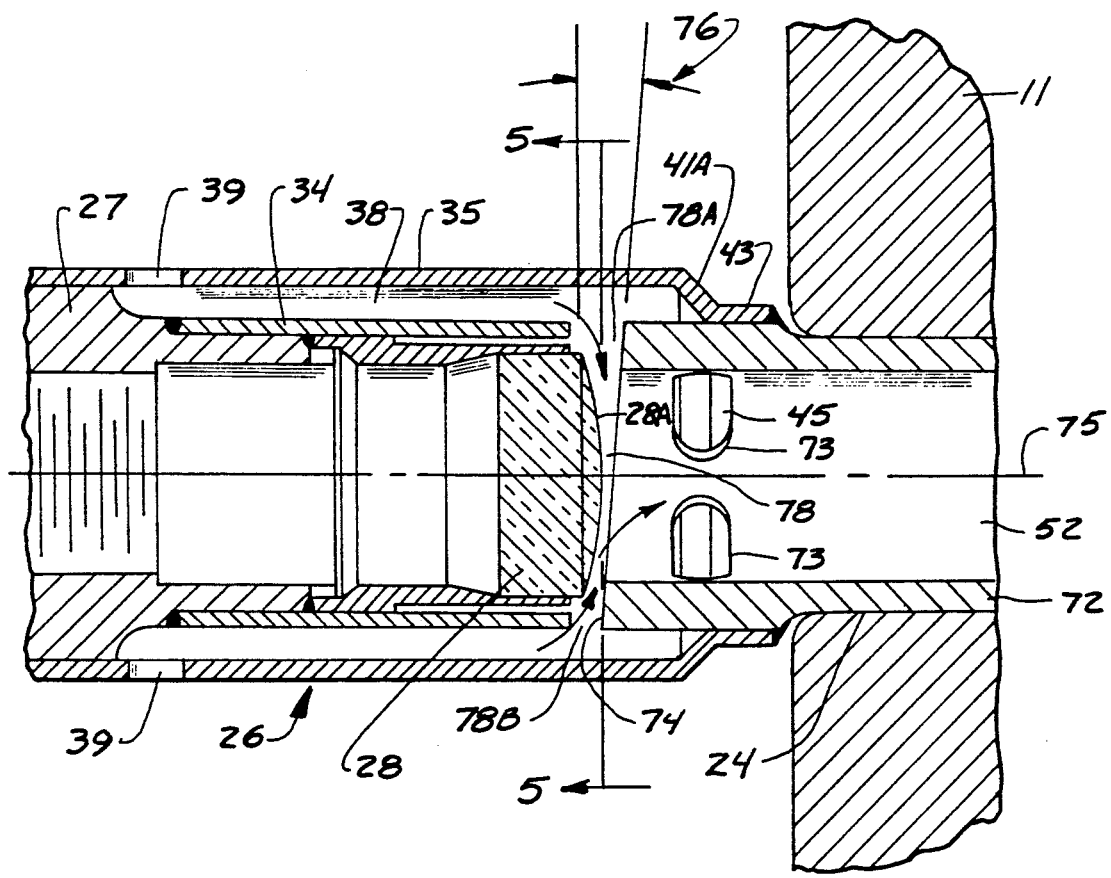
FIG. 4 is a sectional view taken substantially on the same line as FIG. 2 showing the modified form of the present invention having a second structure for obtaining asymmetric flows across a lens to be purged.
Figure 5:
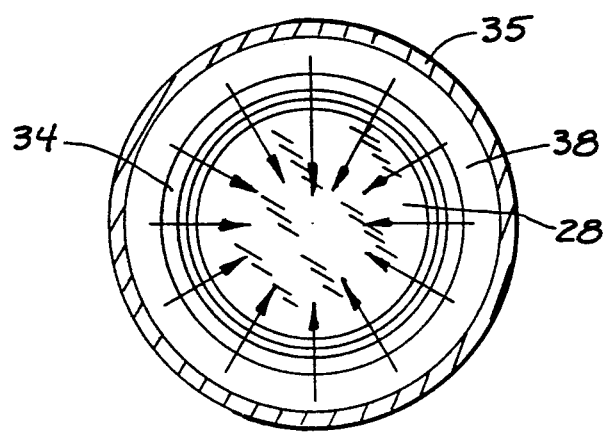
FIG. 5 is a view taken on line 5—5 showing general air flow patterns on the lens shown in FIG. 4.

In a second form of the invention shown in FIG. 4, the unobstructed annular slot is formed to provide flow over the lens, as well. The outer tubular sleeve end portion 35 of the sight tube 26 supports the barrel 27 as shown in FIG. 2, but in this form of the invention, the spring 56 is not used. The sight tube sleeve in this form of the invention is indicated at 72, and fits within the bore 24 of the case 11. The sleeve 72 has secondary flow openings 73, and has an end surface indicated at 74 that defines a plane that is inclined with respect to the central axis 75 of the sight tube sleeve 72. This inclination is shown at double arrows 76. The inclination or tapering of the end cut plane 74 forms a surface that defines a slot or gap indicated at 78 that is wider at the top 78A of FIG. 4, and is narrower as shown at 78B at the lower portion of the slot or gap. As generally shown by arrows in FIG. 5, this tapered slot 78 provides for an asymmetric flow because there will be a greater inlet flow from the larger gap portion 78A than there is from the narrower gap 78B, and because the slot 78 smoothly tapers from its maximum width point shown at 78A to its minimum point shown at 78B, the air flow pattern generally will be asymmetrical and will tend to shift laterally across the lens 28.

The construction shown in FIG. 4 is otherwise the same as in FIG. 2, including the lens 28, and its surrounding sleeve 34 which in conjunction with outer tubular end portion 35 defines passageway 38, through which the purge air flows from the openings 39.

It should be noted that openings 39 can be of any desired number sufficient to provide an adequate volume of flow for purging radiation transparent windows which are open to particle laden air.

In the embodiment shown in FIGS. 1 and 2, helical flow of incoming purge fluid results due to the helix in passageway 38. The helical flow applies a centrifugal force to particles in the fluid near the helix. The centrifugal force tends to move the larger particles radially outward so that there is the benefit of centrifugal particle separation from the portion of fluid nearest the helix. The fluid near the helix is later turned to flow over the window, providing inertial separation, thereby providing a cleaner supply of purge fluid to the lens surface.

Although the present invention has been described with reference to preferred embodiments, workers skilled in the art will recognize that changes may be made in form and detail without departing from the spirit and scope of the invention.

What is claimed is:

1. A radiation sensing instrument, comprising:

means defining a port open to a source of radiation to be measured;

a radiation transparent window having a surface open to the port and spaced therefrom, said window having a center and a peripheral edge; and means for purging the surface of the window comprising means for establishing a flow of air around the peripheral edge of the window in direction generally toward the center and for causing the flow to move over the entire peripheral edge of the window inwardly toward the center thereof and toward the port to purge the surface of the window, the means for establishing comprises a substantially continuous flow slot around the peripheral edge to provide continuous peripheral flow inwardly toward the center from the peripheral edge.

2. The radiation sensing instrument of claim 1 wherein the means for purging further comprises means causing the flow to constrict into a passageway of smaller transverse size than the window for outflow of air from the lens.

3. The radiation sensing instrument of claim 2, wherein the means causing the flow to constrict comprises a tubular sleeve having the port at a first end, and having a second end with a peripheral end surface spaced from the window in direction toward the port, said tubular sleeve being supported relative to the window between its first end and the second end surface.

4. The radiation sensing instrument of claim 2 wherein said means for establishing a flow of air around the peripheral edge of the window comprises a sleeve spaced outwardly from the peripheral edge of the window and forming an annular passageway around the window, a source of fluid under pressure establishing a flow through the annular passageway, and said means causing the flow to constrict comprising a second sleeve substantially concentric with the window and spaced from the surface of the window to form an annular slot around the peripheral edge through which air can flow into the second sleeve and across the window surface.

5. The radiation sensing instrument of claim 4 and means for establishing a secondary flow of air from said annular passageway to permit inertial particle separation of the primary flow.

6. The radiation instrument of claim 5 wherein said second sleeve has an end surface facing the window and spaced therefrom, the end surface being configured to form the annular slot such that the slot has a larger dimension of spacing from the window at selected portions thereof and which selected portions are asymmetrically positioned around the peripheral edge.

7. The radiation sensing instrument of claim 6, wherein said slot is formed by the end surface of the second sleeve being inclined with respect to a central axis of said second sleeve to form a gap having unequal width at one side of the window with respect to a directly opposite side.

8. The radiation sensing instrument of claim 4, and deflector means comprising a generally helical surface portion in said annular passageway to establish a generally helical glow around a central axis of said annular passageway prior to the flow reaching the peripheral edge of the window.

9. A tubular radiation sensing instrument, comprising:

a sleeve having a first end defining a port open to a source of radiation to be measured and a second end spaced in direction away from the source and having a wall terminating on a generally radial end surface surrounding a central passageway leading to the port;

a radiation transparent window having a surface facing the end surface of the sleeve and spaced therefrom, said window having a peripheral edge larger than the passageway in the sleeve; and means for establishing a flow of air which surrounds the peripheral edge of the window and for causing the flow to constrict inwardly from the peripheral edge into the passageway, the flow passing over the entire peripheral edge of the window and into the passageway in the sleeve, the second end of the sleeve having no supports extending across the space between the sleeve end surface and the window.

10. The radiation sensing instrument of claim 9 wherein said means for establishing a flow of air around the peripheral edge of the window comprises an outer tubular sleeve spaced outwardly from the peripheral edge of the window and forming an annular passageway around the window.

11. The radiation sensing instrument of claim 9 wherein the passageway in the sleeve has a central longitudinal axis, the end surface defining a plane at an acute angle with the central axis.

12. The radiation sensing instrument of claim 9 and means for establishing a swirling air flow between the peripheral edge of the window and the passageway in the tubular sleeve.

13. A radiation sensing instrument, comprising:

means defining a port open to a source of radiation to be measured;

a radiation transparent window having a surface open to the port and spaced therefrom, said window having a peripheral edge;

means for purging the surface of the window comprising a wall spaced outwardly from the peripheral edge of the window forming an annular passageway around the window;

means for forming an annular unobstructed slot flow passageway for directing flow to move inwardly across the window surface;

means for establishing a flow through the annular passageway and flow passageway; and flow deflector means having surfaces affecting flow in at least a portion of at least one of the passageways to establish a generally helical flow around a central axis of said instrument as the flow moves across the peripheral edge of the window.

14. A radiation sensing instrument according to claim 13, wherein said deflector means comprises a surface that has a generally helical configuration that is contacted by the flow to establish the generally helical flow.

15. The radiation sensing instrument of claim 13, wherein said means defining a port comprises a tubular sleeve generally concentric with a central axis of the annular passageway and having an end surface generally perpendicular to such axis spaced from the surface of the window and forming an interior passageway for carrying flow from the window, said surface having selected portions that are spaced from the window a greater distance than other portions of the window, so that the space between the surface and the window is different lengths measured in direction along the central axis than other portions of that surface.

* * * * *